Oct. 29, 1968  R. S. ZEBARTH ETAL  3,408,057
POULTRY HOCK HEATER
Filed Feb. 23, 1966  2 Sheets-Sheet 1

INVENTORS.
Ralph S. Zebarth
Drexel T. Carlson
BY John A. Hamilton
Attorney.

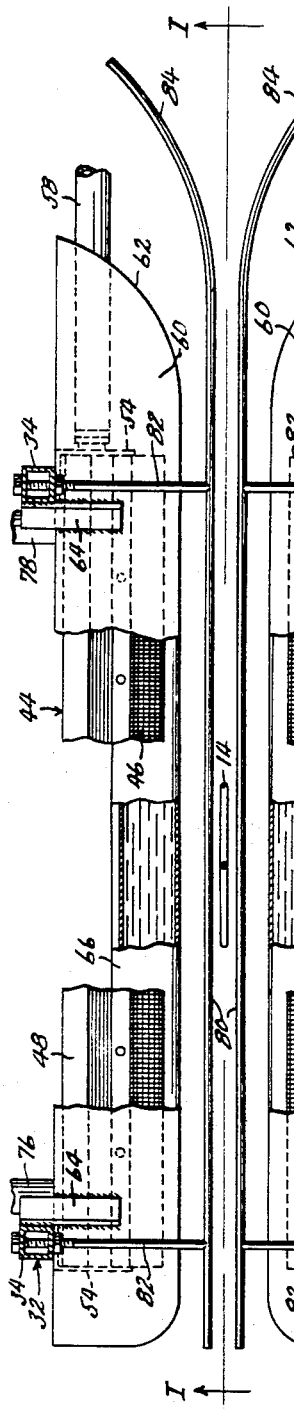
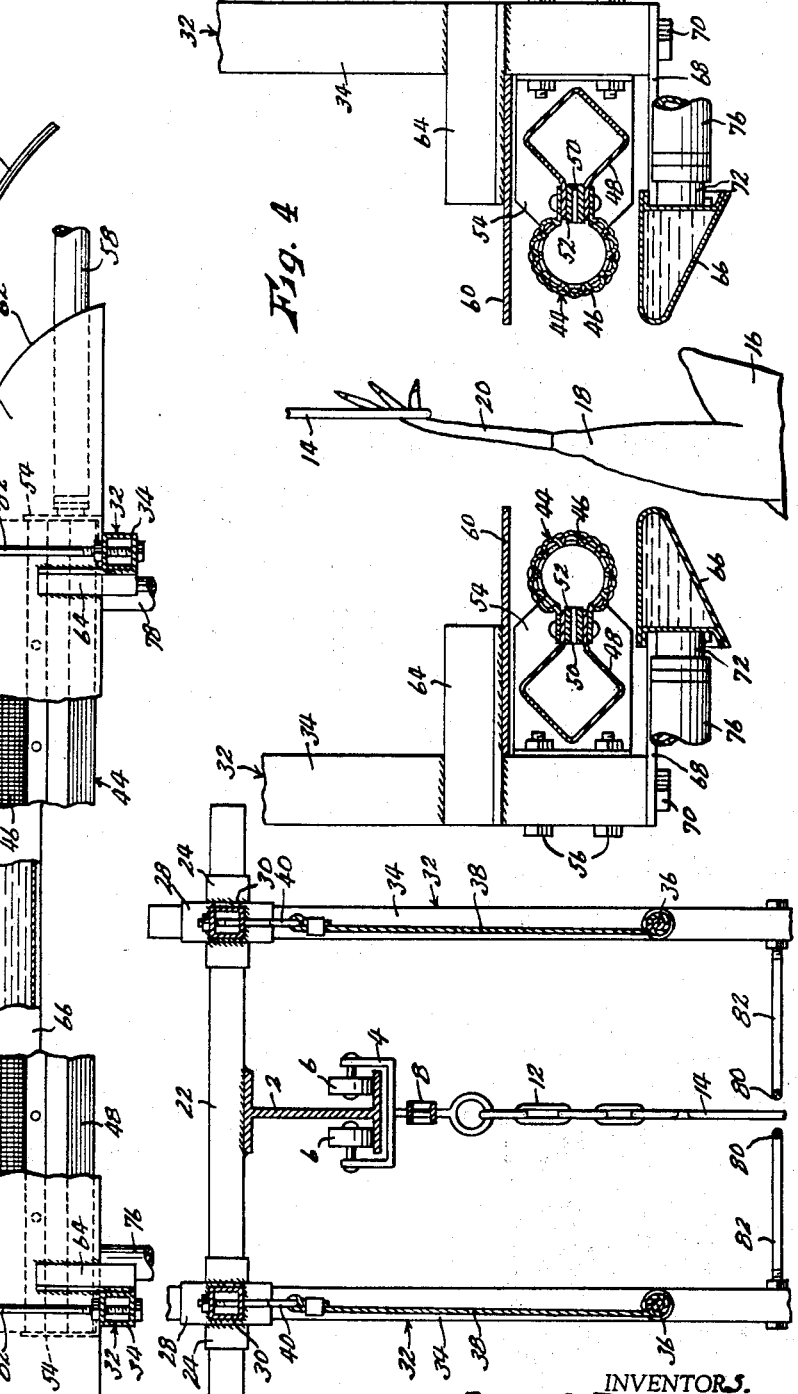

United States Patent Office 3,408,057
Patented Oct. 29, 1968

3,408,057
POULTRY HOCK HEATER
Ralph S. Zebarth, Kansas City, Mo., and Drexel T. Carlson, Leawood, Kans., assignors to Ralph Zebarth, Inc., Kansas City, Mo., a corporation of Missouri
Filed Feb. 23, 1966, Ser. No. 529,278
8 Claims. (Cl. 263—8)

ABSTRACT OF THE DISCLOSURE

A poultry hock heater for heating the hocks of poultry as they are moved along a conveyor line, whereby to facilitate removal of feathers therefrom, comprising a pair of elongated radiant heaters extending along the path of travel of said conveyor, respectively at opposite sides of said path and at an elevation to direct heat against the hocks of birds carried thereby, guard members operable to confine the heat of said heaters to the desired portions of said birds, and to prevent contact of said birds with said heaters, and means for cooling such of said guard members as may engage the skin of the birds, whereby to prevent burn marks on said skin.

---

Figure 1:
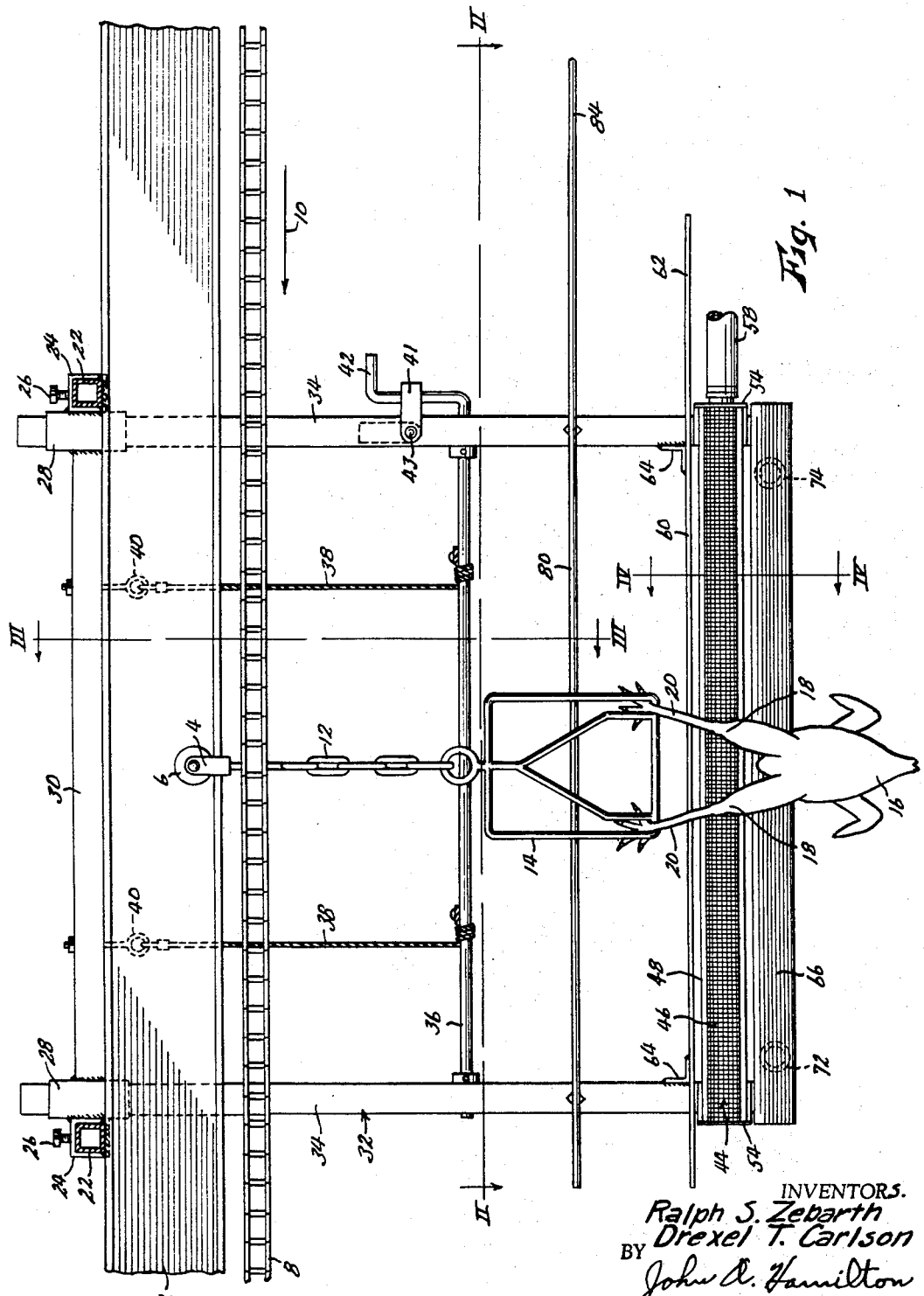

This invention relates to new and useful improvements in poultry processing equipment, and has particular reference to a hock heater used for facilitating the removal of feathers from the hock portions of the carcass.

In the process of defeathering poultry by mechanical means, such as by engagement of the carcass with flexible fingers mounted on rotating drums, discs and the like, former practice called for a preliminary "hard" scalding of the bird, by completely immersing it in water of about 145–160° F. The scalding of course softened and relaxed the feather follicles of the skin in order that they would more easily release the feather shafts. This high scalding temperature was necessary in order that the feathers of the entire carcass could be removed in a single picking operation, or series of picking operations, without additional scalding. However, the high temperature of the hard scald also resulted in a darkening or reddening discoloration of the entire carcass. While not particularly harmful, this discoloration robbed the carcass of its "fresh" appearance, reducing its saleability and hence its commercial value.

As a result, it has been found desirable to use a considerably cooler preliminary scalding temperature of about 124–128° F. This prevents discoloration of the carcass and preserves its fresh appearance, but of course does not soften and relax the feather follicles to the same extent as the hard scald. As a result, in certain areas of the carcass where the feathers are coarse and the skin is thick and tough, the feathers cannot be efficiently and completely removed by the usual mechanical picking devices. Notably, the most difficult areas in this respect are the hocks, these being the lower portions of the "drumsticks," adjacent their juncture with the yellow, unfeathered lower leg. Another problem in connection with the hocks is that the portions of the yellow cuticle of the lower leg often remain with the drumstick when the bird is later dismembered, which is unsightly and objectionable. It has therefore been found desirable to reheat the hocks after the picking has otherwise been completed, to a temperature higher than that of the preliminary scald, whereby to provide further softening and relaxation of the hock skin and of any lower leg cuticle which may overlap the hock, and then subject the carcass to another picking operation directed solely or primarily to the hocks, whereby to remove the last vestiges of feathers and cuticle therefrom. It is to the problems inherent in this reheating of the hocks that the present invention is directed.

For example, since in a reheating the heat should be localized as much as possible in the hocks only, in order to prevent reheating and discoloration of the rest of the bird, it has been proposed to dip the legs and hocks only into a scalding bath. However, most poultry in modern processing plants is picked while suspended by the legs from a continuously moving conveyor system, and the dipping requires reversal of the birds on the conveyor to be suspended by their necks. This reversal is an additional step which furthermore sometimes requires interruption of the conveyor travel, and hence is costly. The dipping tanks required also are very bulky and space consuming. Hence, important objects of the present invention are the provision of a hock heater which does not require reversal of the birds or interruption of the conveyor movement, and which is extremely compact. It may in fact be suspended from the conveyor structure in an overhead position so as to occupy only space which would otherwise not be utilized.

Another object is the provision of a hock heater of the character described wherein the heat is applied in the form of high-intensity radiant dry heat. Not only does this obviate necessity of reversing the bird, as it may be applied with the bird in any position, but also has been found to produce a maximum sub-surface effect to produce relaxation of the feather follicles, with a minimum of surface heating and hence a minimum of discoloration. This effect is particularly apparent when the exposure is made very intense, as by positioning the bird close to the heat source, but for a very short time period. These factors of close spacing and short exposure permit further reduction of the size of the apparatus.

The use of radiant heat sources spaced close to the bird necessitate the use of guard members, both to maintain a minimum spacing between the bird and the heater to prevent contact burn marks on the bird, and also to confine the heat application to the desired portions of the bird. These guard members, being subject to continuous heating, tend to become extremely hot, and would also produce burn marks if they contacted the carcass. Another object of the present invention is, therefore, the provision of means for continuously cooling any such guard members which could be contacted by any critical portion of the bird.

Other objects are simplicity and economy of construction, efficiency and dependability of operation, and the provision of means for adjusting the device to the length and thickness of the particular poultry being processed.

With these objects in view, as well as other objects which will appear in the course of the specification, reference will be had to the accompanying drawing, wherein:

FIG. 1 is a vertical sectional view of a poultry hock heater embodying the present invention, taken on line I—I of FIG. 2, FIG. 2 is a sectional view taken on line II—II of FIG. 1, with portions broken away for clarity, FIG. 3 is a fragmentary sectional view taken on line III—III of FIG. 1, and FIG. 4 is an enlarged, fragmentary sectional view taken on line IV—IV of FIG. 1.

Like reference numerals apply to similar parts throughout the several views. Illustrated is a conveyor system commonly used in poultry defeathering operations, said conveyor including a horizontally extending, rigidly supported I-beam 2. A series of brackets 4 (one shown) each carry rollers 6 resting on the lower flanges of the I-beam so as to be movable therealong, said brackets being connected by a sprocket chain 8 below the beam, said chain being longitudinally driven, by means not shown, to move the brackets along the beam, in the direction of arrow 10 in FIG. 1. Also suspended from each bracket 4 is a short chain 12, to the lower end of which is attached a shackle 14, of any suitable type, from which a poultry carcass 16 may be suspended by its legs, as shown. The hock portions to be heated are designated generally by the numeral 18, being that portion of the bird's "drumsticks" adjacent the unfeathered lower legs 20.

The hock heater forming the subject matter of the present invention includes a pair of bars 22 extending horizontally and transversely across the top of I-beam 2, each bar being welded at its midpoint to said beam, and extending outwardly therefrom. Mounted slidably on each end portion of each of bars 22 is a tubular sleeve 24, each of said sleeves being provided with a set screw 26 (see FIG. 1) for fixing it adjustably on said bar. Fixed to each sleeve 24 is a vertical tubular sleeve 28. The sleeves 28 at each side of I-beam 2 are rigidly interconnected by a horizontal bar 30 extending parallel to beam 2.

Carried by vertical sleeves 28 at respectively opposite sides of beam 2 are a pair of frames 32 each including a pair of vertical bars 34 the upper portions of which are vertically slidable in the associated sleeves 28. Intermediate their ends, the bars 34 of each frame 32 have an axle 36 extending therebetween and journalled rotatably therein. A pair of cables 38 are affixed to and wound around each axle, and then are extended upwardly and attached at their upper ends to eyes 40 fixed in the associated bar 30. One end of each axle 36 is extended to form a manually operable crank 42. By turning said crank, cables 38 may be wound on or unwound from the axle 36, whereby to raise or lower the associated frame 32 with respect to the conveyor and the poultry suspended therefrom. The frame bar 34 adjacent each crank 42 is provided with a stop 41 pivoted thereto at 43, said stop being pivoted from its solid line position as shown in FIG. 1, wherein it prevents rotation of the crank, to its dotted line position, wherein it permits free rotation of the crank.

A radiant heater 44 is carried at the lower end of bars 34 of each frame 32, extending horizontally in a direction parallel to the path of poultry travel. Said heater comprises an elongated burner tube 46 formed of sheet metal which is slit and pressed to form a multiplicity of louvered openings dispersed over the entire area thereof, as best indicated in FIG. 4. Said burner tubes confront the path of poultry travel from respectively opposite sides thereof. Behind each burner tube is a tubular gas conduit 48 parallel therewith, from which natural gas or other suitable fuel is fed to the associated burner tube through apertures 50 of a fuel distributing bar 52 extending between and interconnecting the gas conduit and the burner tube, as shown in FIG. 4. The heater is provided at each end with a bracket 54, said brackets being affixed respectively to the lower end portions of bars 34 of the associated frame, as by bolts 56. Fuel is fed to gas conduit 48 of each heater through a flexible hose 58 at one end thereof, the opposite ends of the hoses of course being interconnected with a suitable source of fuel. With burner tubes of the type shown, virtually no flame escapes said tubes. Instead, combustion occurs entirely within the tubes, heating them to an incandescent temperature, whereby they radiate a high-intensity infra-red energy or heat.

Immediatelly above heater 44, each frame 32 carries a horizontally disposed guard plate 60 which is elogated in a direction parallel to the poultry travel. The confronting edges of said guard plates are parallel and spaced respectively at opposite sides of the vertical plane of poultry travel. Also, these confronting edges of the guard plates overhang and extend inwardly from the burner tubes 46 of the heaters, and are accurately flared at the entry end of the machine, as indicated at 62. Each guard plate is affixed to bars 34 of the associated frame by angle iron brackets 64.

Immediately below heater 44, each frame 32 carries an elongated hollow guard rail 66, having the form of a slender tank extending parallel to the burner tube, and provided at each end with a bracket 68 affixed to the extreme lower end of the associated frame bar 34 by a screw 70 (see FIG. 4). Said guard rail tanks are of triangular cross-sectional contour, the apexes of which confront each other at opposite sides of the path of poultry travel, extending closer to the vertical plane of said travel than burner tubes 46. Preferably, these confronting edges are spaced apart approximately the same distance as the confronting edges of guard plates 60. Each guard rail 66 is provided with a water inlet 72 and a water outlet 74 adjacent respectively opposite ends thereof, to which flexible hoses 76 and 78 are respectively joined for connection one to a suitable source of cool water under pressure and the other to a suitable drain. In this manner, cool water is continuously circulated through guard rails 66 to cool them.

It will be seen that conveyor shackle 14 is essentially planar in form, and suspends carcass 16 by the legs in such a manner that said legs are disposed generally in the vertical plane of the shackle. However, said shackle is free to pivot about a vertical axis to some extent due to the chain 12 supporting it. Therefore, to keep the carcass legs generally in the vertical plane of travel, and hence generally equidistant from the two burner tubes 46, there is provided a pair of guide rods 80 disposed above guard plates 36 in closely spaced relation parallel to the direction of poultry travel, and attached respectively to bars 34 of the associated frames 32 by connecting rods 82. The guide rods are disposed at the vertical elevation of shackle 14, whereby to maintain the plane of said shackle generally in the vertical plane of travel. At the entry end of the machine, rods 80 are flared apart, as indicated at 84, to facilitate entry of shackles 14 therebetween.

In use, frames 32 are adjusted vertically by turning cranks 42 until burner tubes 46 of the heater units are disposed at the vertical elevation of the hock portions 18 of the birds, as shown. In any given installation, this adjustment will of course depend on the size (vertical length) of the poultry being processed. Also, frames 32 are adjusted horizontally and transversely to the conveyor, by loosening set screws 26 and sliding sleeves 24 or bars 22, until burner tubes 46 are disposed at the desired horizontal spacing from the hocks, this spacing depending on the size of the birds, and on other factors to be discussed. Then, as the conveyor operates to move carcasses between the burner tubes, the hocks are heated to soften and relax the feather follicles of the skin, and also any leg cuticle which may overlap the hock, so that the final defeathering and cuticle removal may subsequently be performed with greater ease and efficiency.

An important advantage of our invention is the use of high-intensity infra-red energy. As previously mentioned, this produces a maximum sub-surface heating effect on the carcass skin, whereby to produce a better softening and relaxing of the feather follicles, with a minimum surface heating effect and hence with virtually no burning or discoloration of the skin. This desirable effect is particularly apparent where the radiant energy is of very high intensity and the exposure time is short. The desirability of high-intensity radiation permits the burners to be placed quite close to the birds, and the desirability of short exposure times permits the burner length to be quite short, and both of these factors contribute to the extreme compactness of the device. For example, in the structure shown, it has been found that with a burner tube temperature of about 1200 degrees Fahrenheit, an average spacing of the hocks from the burner tubes of about 2.5–3.0 inches and an exposure time of 9–10 seconds produces highly efficient results on chickens of average size. With a common conveyor speed of about 20 feet per minute, the burner tubes thus need to be only about three feet in length. These figures are of course merely exemplary, and may be varied according to particular circumstances. For example, larger birds such as turkeys may require radiation of still higher intensity and longer duration. This may be provided by raising the burner temperature, by moving the burners closer to the birds, or by lengthening the burners.

Guard plates 60 and guard rails 66 serve the dual function of directing the radiant energy of the burners to the hock portions of the birds so that it is concentrated in the desired area and does not appreciably affect other portions of the birds, and of preventing any direct contact of the birds with the burner tubes. While the spacing of the burners from the birds is normally sufficiently great that they would not contact the birds as long as the birds hang vertically, the birds often swing or sway laterally to their path of travel, due to the flexibility of the carcasses themselves, irregularities of conveyor movement, and other factors. This lateral swinging might bring the hocks into contact with the burners were it not for the guards, and this would produce unsightly and highly objectionable burn marks on the hocks.

Since guards 60 and 66 are stationary, they tend to become heated to a very high temperature, and could also produce burn marks on the carcass in the same manner as the burner tubes themselves. This is no problem in connection with upper guard plates 60, since they can be engaged only by the unfeathered lower legs 20 of the birds, which are of course either discarded or further processed before resale. However, lower guard rails 66 can be engaged by the "drumsticks" or hocks of the bird, and burn marks on the hocks would of course downgrade and reduce the resale value thereof. The continuous circulation of coil water in said lower guard rails, as previously described, maintains said rails sufficiently cool that they cannot produce burn marks on the hocks.

While we have shown and described a specific embodiment of our invention, it will be readily apparent that many minor changes of structure and operation could be made without departing from the spirit of the invention as defined by the scope of the appended claims.

What we claim as new and desire to protect by Letters Patent is:

1. In combination with a conveyor operable to move a poultry carcass along a predetermined, horizontally extending path of travel, said carcass being suspended by its legs, a heater for the hock portions of said legs, said heater comprising:
   a. a pair of elongated heater units each comprising an elongated burner tube formed of sheet metal having closely spaced openings dispersed over substantially the entire area thereof, and means for introducing gas fuel into said burner tube for combustion therein, whereby said burner tube is heated to an incandescent temperature, and means for supporting said heater units in stationary positions extending parallel to said path of travel at the elevation of the hock portions of said carcass, said heaters confronting each other from respectively opposite sides of said path of travel whereby said carcass passes therebetween as it is moved by said conveyor.

2. In combination with a conveyor operable to move a poultry carcass along a predetermined, horizontally extending path of travel, said carcass being suspended by its legs, a heater for the hock portions of said legs, said heater comprising;
   a. a pair of elongated heater units operable to emit a dry, radiant heat,
   b. means for supporting said heater units in stationary positions extending parallel to said path of travel at the elevation of the hock portions of said carcass, said heaters confronting each other from respectively opposite sides of said path of travel whereby said carcass passes therebetween as it is moved by said conveyor, and
   c. a pair of generally horizontal guard members supported in stationary positions respectively above and below each of said heater units, said guard members being elongated in a direction parallel to said heater unit to a length at least as great as that of said heater unit, the confronting longitudinal edges of corresponding guard members of the two heater units being parallel and spaced at respectively opposite sides of the vertical plane of said path of travel, whereby said carcass may pass therebetween, said guard members serving to direct and largely confine the heat emanated by said radiant heaters to the hock portions of said carcass.

3. The structure as recited in claim 2 wherein the confronting edges of corresponding guard members of said two heater units extend closer to the vertical plane of said path of travel than do said heater units, whereby to engage said carcass to prevent contact between said carcass and said heater units in the event said carcass should swing laterally to its path of travel.

4. The structure as recited in claim 3 with the addition of:
   a. means for cooling the lower of said guard members whereby to prevent them from burning said carcass in the event said lateral swinging of said carcass should bring it into engagement with said guard members.

5. In combination with a conveyor operable to move a poultry carcass along a predetermined, horizontally extending path of travel, said carcass being suspended by its legs, a heater for the hock portions of said legs, said heater comprising:
   a. a pair of elongated heater units operable to emit a dry, radiant heat,
   b. means for supporting said heater units in stationary positions extending parallel to said path of travel at the elevation of the hock portions of said carcass, said heaters confronting each other from respectively opposite sides of said path of travel whereby said carcass passes therebetween as it is moved by said conveyor, and
   c. A horizontally elongated guard member disposed in a stationary position immediately beneath each of said heater units, being parallel with and of at least coextensive length with said heater unit, the confronting edges of the two guard members being parallel with said path of travel and spaced more closely to the vertical plane of said path than are said heater units, and
   d. means for cooling said guard members.

6. The structure as recited in claim 5 wherein said guard members are of thin-walled tubular construction, and wherein said cooling means constitutes means for circulating a cooling liquid through the interiors of said guard members.

7. In combination with a conveyor operable to move a poultry carcass along a predetermined, horizontally extending path of travel, said carcass being suspended by its legs, a heater for the hock portions of said legs, said heater comprising:
   a. A pair of elongated heater units operable to emit a dry, radiant heat,
   b. means for supporting said heater units in stationary positions extending parallel to said path of travel at the elevation of the hock portions of said carcass, said heaters confronting each other from respectively opposite sides of said path of travel whereby said carcass passes therebetween as it is moved by said conveyor, said supporting means comprising a pair of frames on each of which one of said heater units is mounted, and stationary structure for supporting said frames, said frames being independently adjustable relative to said supporting structure whereby to vary the vertical elevation of said heater units relative to said path of poultry carcass travel, and whereby to vary the spacing between said heater units transversely to said path of travel.

8. The structure as recited in claim 2 wherein said means for supporting said heater units comprises:
   a. a pair of frames on each of which is mounted one of said heater units and the upper and lower guard members associated with that heater unit, whereby a fixed relationship is maintained between said heater and its guard members, and
   b. stationary structure for supporting said frames, said frames being independently adjustable relative to said supporting structure whereby to vary the vertical elevation of said heater units relative to said path of poultry carcass travel, and whereby to vary the spacing between said heater units transversely to said path of travel.

References Cited

UNITED STATES PATENTS

| | | | |
|---|---|---|---|
| 1,975,196 | 10/1934 | De Vout | 17—20 XR |
| 2,500,872 | 3/1950 | Root et al. | 219—354 XR |
| 2,732,583 | 1/1956 | Dolah | 17—11.2 |
| 2,749,108 | 6/1956 | Hess | 263—6 |
| 2,869,856 | 1/1959 | Greene | 263—6 XR |
| 2,980,544 | 4/1961 | Mills | 34—4 XR |
| 3,121,520 | 2/1964 | Gann | 34—4 XR |
| 3,138,822 | 6/1964 | Amstad | 17—11.2 |
| 3,247,543 | 4/1966 | Bonuchi et al. | 17—11 XR |
| 3,312,269 | 4/1967 | Johnson | 158—99 |

FREDERICK L. MATTESON, JR., *Primary Examiner.*

A. D. HERRMANN, *Assistant Examiner.*